Aug. 10, 1926.
P. VOSEN
1,595,174
NUT LOCK
Filed Oct. 20, 1925
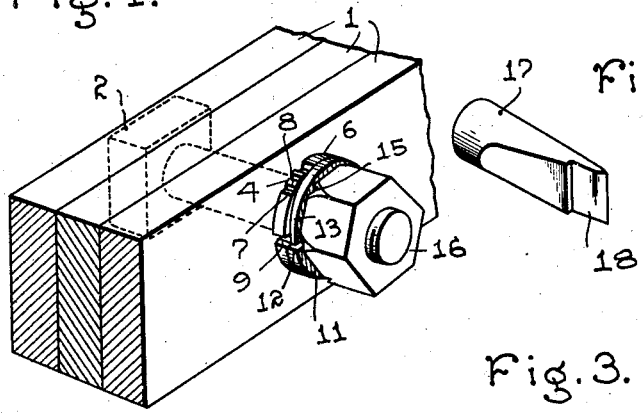
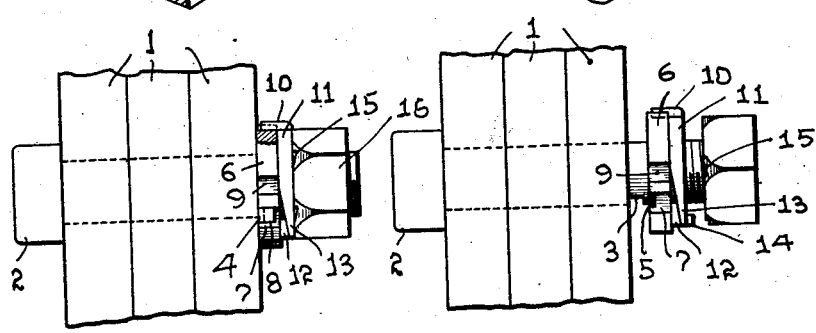
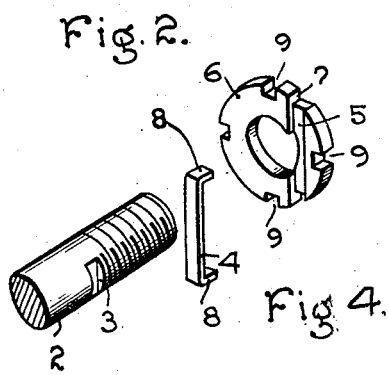
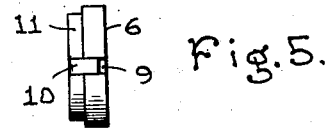
Inventor
PETER VOSEN
Attorney Patented Aug. 10, 1926.

1,595,174

UNITED STATES PATENT OFFICE.

PETER VOSEN, OF FLANDERS, ONTARIO, CANADA.

NUT LOCK.

Application filed October 20, 1925, Serial No. 63,709, and in Canada October 21, 1924.

The object of the invention is to provide a locking means for nuts to positively preclude reverse or unturning movement when attached; and to provide a construction of this character in which an appropriate key may be employed to effect unlocking so that the nut may be removed when occasion demands.

With this object in view, the invention consists in a construction and combination of parts of which a preferred embodiment is illustrated in the accompanying drawings, wherein:

Figure 1 is a perspective view showing the invention applied in operative position.

Figure 2 is a side elevational view of the structure of Figure 1.

Figure 3 is a view similar to Figure 2 showing the nut in released position.

Figure 4 is a collective perspective view showing a portion of the bolt, the locking washer and the locking connection between the bolt and washer.

Figure 5 is a detail edge elevational view showing the nut and bolt locking washer.

Figure 6 is a detail perspective view of the end of the releasing key.

The invention is shown as applied to the bolt 2 employed to secure the members 1 together. That portion of the bolt projecting beyond the members is formed with a flat 3 preferably made by filing the shank of the bolt. This flat is engaged by a key 4 seated in a recess 5 of a bolt locking washer 6. The key and its recess are so positioned that the edge of the key will overlie the margin of the opening through the washer in order to engage with the flat 3 of the bolt shank. At opposite ends of the recess 5, the locking washer 6 has recesses 7 with which the upset or deflecting ends 8 of the key engage.

The marginal edge of the locking washer is provided with a plurality of notches 9 which are diametrically opposed and any one of which may receive a lateral lug 10 of a nut locking washer 11. This latter washer is split, as shown at 12, and includes an arcuate spring tongue 13, the outer face of which is a continuation of and lies flush with that face of the body of the washer adjacent the nut. The terminal of the spring tongue has a lateral beveled portion which is designed to engage any one of the correspondingly shaped notches 15 on one face of the nut 16.

Since the nut locking washer is connected by a lug and notch with a bolt locking washer which, in turn, is locked to the bolt by the key which engages the flat on the bolt and the recess in the washer, the nut becomes locked against turning movement on the bolt. It will be observed that the notches in one face of the nut do not extend fully to the bore of the nut, there being a wall from one notch to the other. Furthermore, the lateral beveled lug corresponds in radial depth with the radial depth of the notches.

A key 17 is provided for unlocking the nut. This key has a reduced end 18 which is V-shaped in cross section, so that it may be readily engaged between the spring tongue of the nut locking washer and the face of the nut, thus deflecting the tongue and disengaging the latter from engagement with the notches of the nut. While so held, a reverse or returning movement may be imparted to the nut to disengage it from the bolt.

The invention having been described, what is claimed as new and useful is:

In combination with a bolt and a nut, said bolt having a flat, a bolt locking washer having a groove in one face partly intersecting the bore of the washer, a key held in said groove and in said flat, the marginal edge of said washer having key receiving seats, the ends of said key being bent over onto said seats, said washer having its other face plane and having at least one notch in its periphery, a nut locking washer interposed between said bolt locking washer and the nut and provided with a lug to enter a notch of said bolt locking washer to hold said washers against turning relatively to one another, said nut locking washer having its nut engaging face plane, and being split, the face of the nut locking washer lying opposite the bolt locking washer being bevelled from the split a sufficient distance to constitute a spring tongue, said tongue having a lateral bevelled portion and said nut having correspondingly shaped notches to receive said lateral bevelled portion, substantially as shown and described.

In testimony whereof, he affixes his signature.

PETER VOSEN.